Nov. 13, 1934.  N. TRACY  1,980,837
GRAIN HULLING MACHINE
Filed April 9, 1932    4 Sheets-Sheet 1
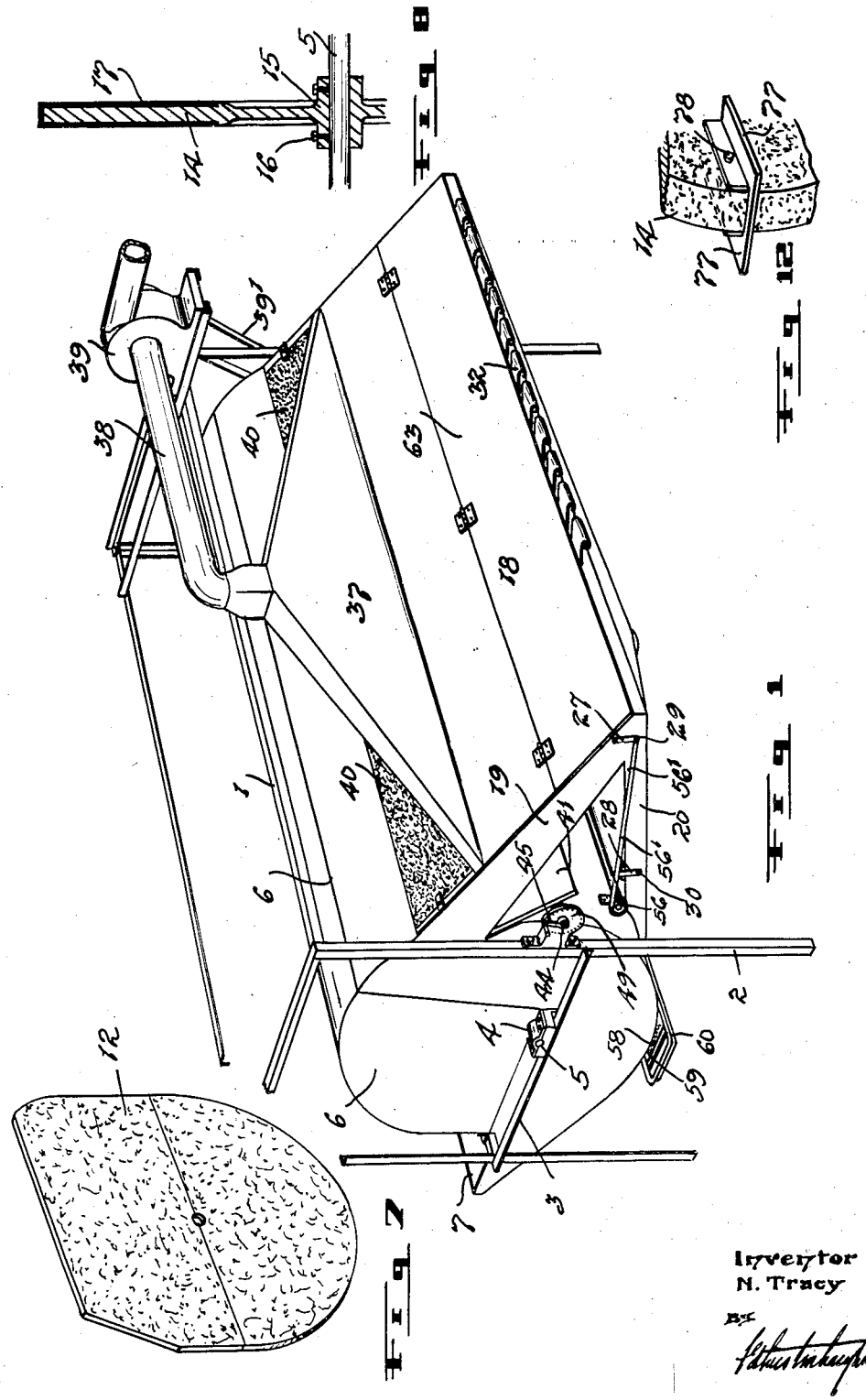
Inventor
N. Tracy

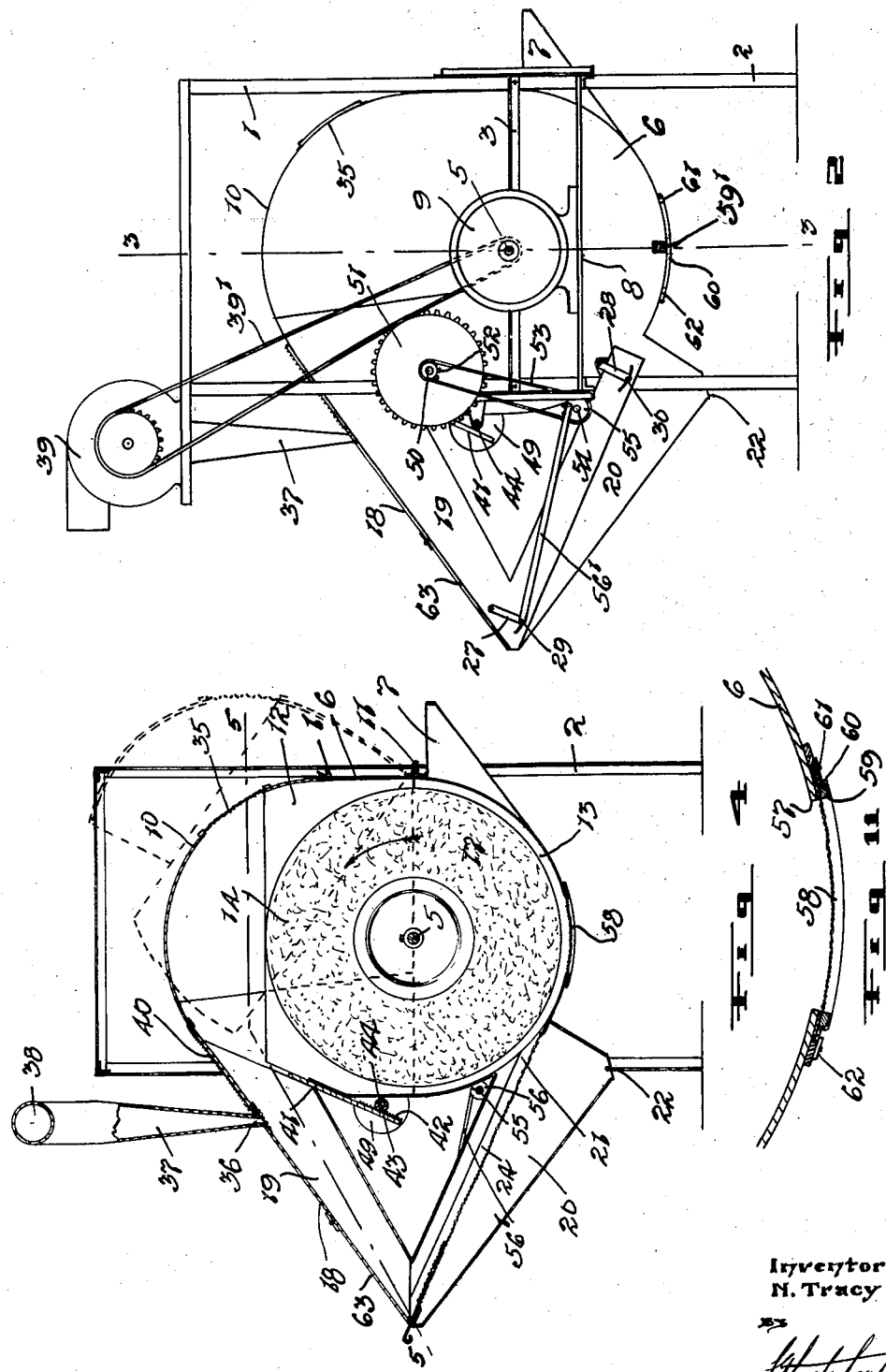

Nov. 13, 1934.　　　　　N. TRACY　　　　　1,980,837
GRAIN HULLING MACHINE
Filed April 9, 1932　　　4 Sheets-Sheet 3
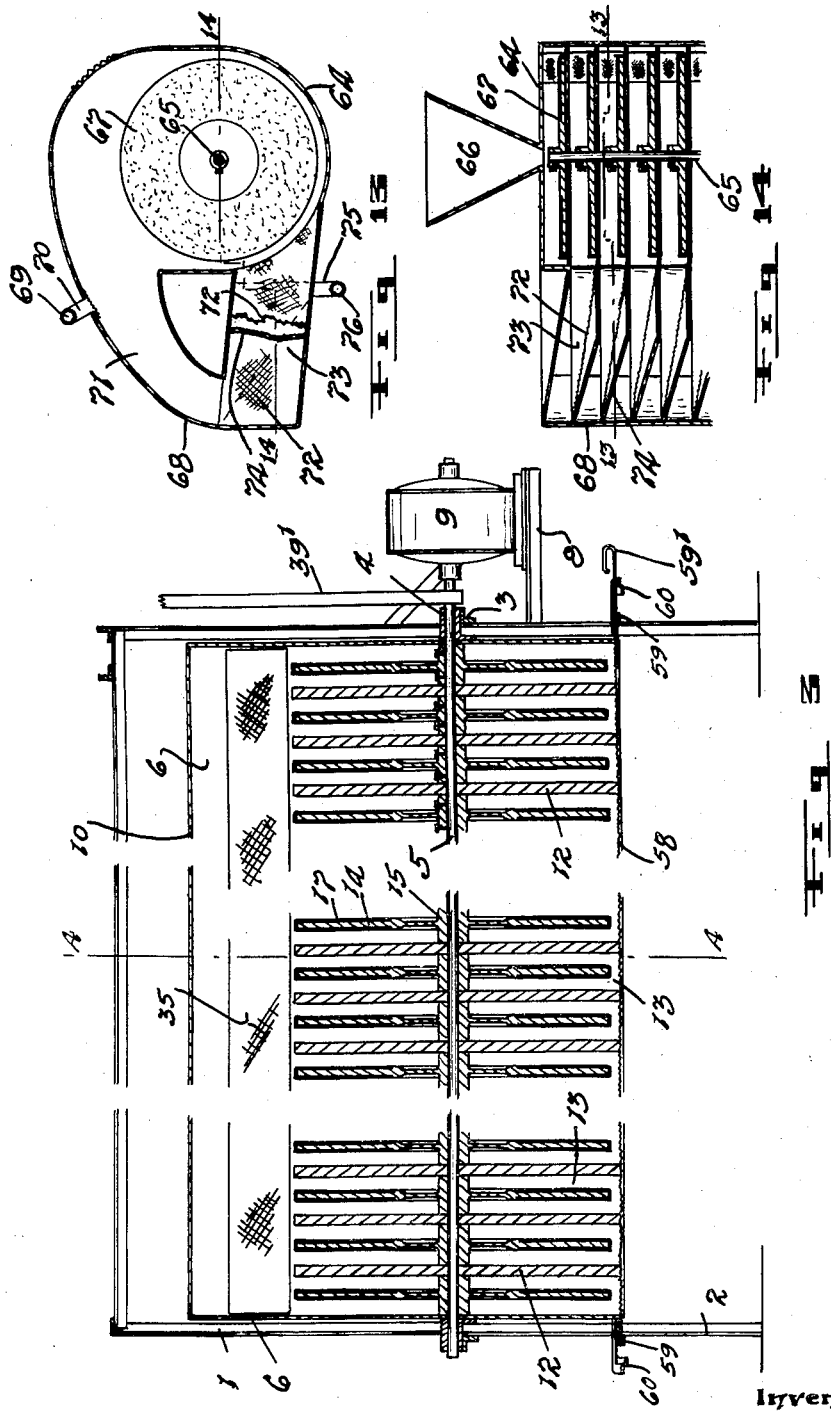

Nov. 13, 1934. N. TRACY 1,980,837
GRAIN HULLING MACHINE
Filed April 9, 1932 4 Sheets-Sheet 4
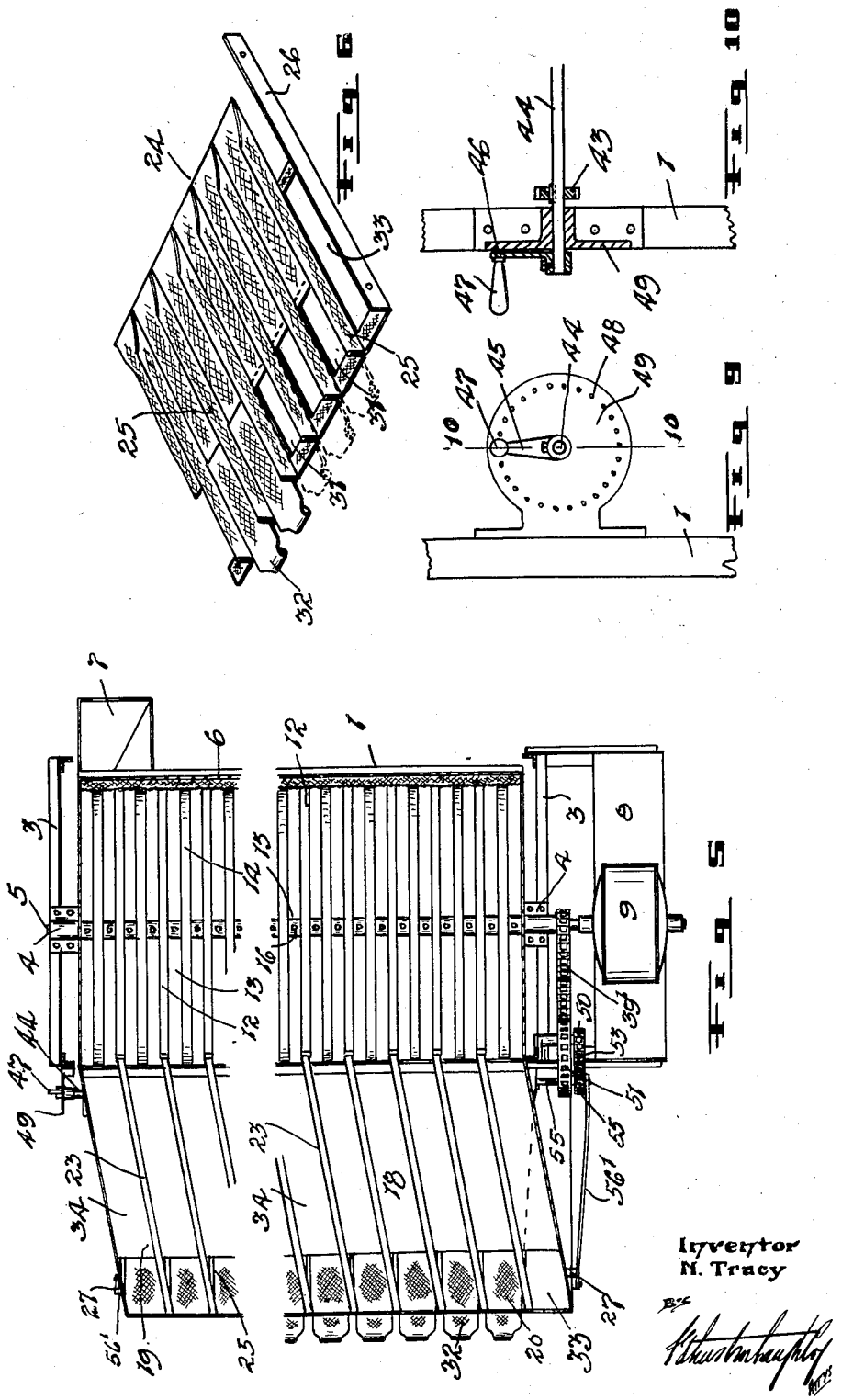

Patented Nov. 13, 1934

1,980,837

UNITED STATES PATENT OFFICE 1,980,837

GRAIN HULLING MACHINE

Nelson Tracy, Carman, Manitoba, Canada

Application April 9, 1932, Serial No. 604,197

4 Claims. (Cl. 83—30)

The invention relates to improvements in grain hulling machines and an object of the invention is to provide a machine particularly designed for hulling and pearling barley and which can be used with slight changes for hulling oats and which is constructed so that the barley can be pearled in the machine to a greater or less degree depending on the requirements, that is to say, depending on whether feed barley, pot barley or pearl barley is required.

A further object of the invention is to provide a machine the casing of which is divided by partitions into a number of relatively narrow compartments and to associate with each compartment a disc rotating at a relatively high speed, the discs and compartments presenting abrasive faces for operating on the grain.

A further object is to provide means for withdrawing the hulls and other light material from the grain as it is being put through the machine and also to construct the machine so that the interior thereof can be readily inspected for repair or other purposes and so that the various working parts are readily accessible.

A further object of the invention is to provide a machine having the compartments and discs aforesaid and wherein the grain thrown out by any disc is caught and directed to chutes leading to the compartment containing the following disc and wherein certain chutes have screen like bottoms allowing the smaller material to go through and be discharged from the machine and causing the larger grain to be directed back into the machine for further abrasion.

A still further object is to provide certain of the screens with escape openings and to associate with those openings, screen like gates which can be opened and closed by the attendant as desired.

A further object of the invention is to provide the machine with a gate which can be adjusted to control the amount of grain discharging from the compartments to the chutes and further to provide the bottom of the casing with a normally closed door which can be opened to permit of the ready cleaning of the machine and to supply the door with a screen underlying all compartments and mounted so that it can be agitated.

A still further object is to provide the machine with means for effecting an air blast in the area where the grain is being discharged from the discs in order to carry away dust and other light material.

A further object is to provide a machine with an abrasive plate positioned so that one of the surfaces thereof will be struck by the grain discharging from the discs and to arrange the plate so that it can be reversed to present a relatively fine or a relatively course abradant surface to the grain.

With the above more important objects in view, the invention consists essentially in the arrangement and construction of parts hereinafter more particularly described, reference being had to the accompanying drawings, in which:—

Fig. 1 is a perspective view of the machine.

Fig. 2 is an end view thereof.

Fig. 3 is a vertical sectional view at 3—3 Figure 2.

Fig. 4 is a vertical cross sectional view at 4—4 Figure 3.

Fig. 5 is a horizontal sectional view at 5—5 Figure 4.

Fig. 6 is a perspective view of a portion of the screen deck.

Fig. 7 is a perspective view of one of the divisional boards or partitions.

Fig. 8 is an enlarged detailed vertical sectional view through a portion of one of the discs.

Fig. 9 is an enlarged detailed face view of the adjusting lever and associated parts.

Fig. 10 is a vertical sectional view at 10—10 Figure 9.

Fig. 11 is an enlarged detailed vertical cross sectional view through the bottom of the casing and showing the bottom screen.

Fig. 12 is a perspective view showing the paddle.

Fig. 13 is a horizontal sectional view showing a modification of the machine.

Fig. 14 is a vertical sectional view through the upper part of the machine appearing in Figure 13.

In the drawings like characters of reference indicate corresponding parts in the several figures.

The main frame 1 of the machine is in the form of a skeleton frame made from angle iron and providing supporting legs 2 and opposing elevated cross bars 3 which carry centrally similar two piece bearings 4 which can be readily taken apart and which rotatably support the ends of the main shaft 5. The main frame supports a horizontally disposed casing 6 formed from sheet metal, the casing being somewhat elliptical in vertical cross section and being provided in the side but adjacent the front end thereof with a feed hopper 7 to receive the grain fed to the machine. At the rear end the frame is supplied with an outstanding bracket 8 which supports a prime mover such as an electric motor 9 and this motor drives the main shaft in the well known manner.

The casing is cut so that the greater portion of the upper part thereof forms a hood 10 which hood is hinged to the frame at 11 so that the said hood can be swung to the side as indicated in dotted outline in Figure 4 to give access to the interior of the casing to permit of the ready inspection of the interior parts or their removal if required.

Interiorly, the casing is divided by a number of similar spaced partitions or separators 12 into a number of similar relatively narrow compartments 13 and each separator is formed from upper and lower sections divided at the main shaft and having the lower sections permanently secured to the under side of the casing and the upper sections permanently secured to the hood, the latter resulting in the upper sections of the separators swinging back with the hood when the same is opened and so exposing the shaft. The separators are coated with an abrasive material.

On the shaft 5, I mount a plurality of similar discs 14, each disc being supplied with a hub 15 which is fastened by jam screws 16 to the shaft. Each disc has the exposed faces thereof abradant as indicated at 17 and in this connection I might mention that an abrasive material can be applied on the non-abrasive body of the disc or the entire disc can be made from an abrasive material such as carborundum. It will be noted also that there is a disc located centrally in each compartment.

A relatively large flume 18 or trunk is located at the side of the casing remote from the hood and this flume is somewhat V-shaped in vertical cross section and has the upper leg 19 thereof opening to the upper part of the casing and the lower leg 20 opening at 21 to the lower part of the casing and such leg is also supplied at the bottom with a discharge outlet 22. The upper leg 19 on the flume has a plurality of vertical divisional boards or partitions 23 therein and the lower leg contains a shoe 24 which is mounted so that it can be reciprocated and is constructed so that it provides a plurality of grain chutes having perforated bottoms.

In Figure 6, a part of the shoe is shown and here it will be observed that it is formed from a perforated sheet metal plate bent at intervals to provide a plurality of equi-spaced upstanding reinforcing ribs 25 which ribs form with the intervening portions of the plate, the chutes referred to. The ends 26 of the plates form the sides of the shoe and said sides of the shoe are supported for reciprocal movement by the well known pivoted pairs of swinging arms 27 and 28, the free ends of the arms being connected to the end pieces 26 by pivot pins 29 and 30 passing through suitable arcuate slots provided in the ends of the lower leg of the flume.

It will be also observed that a number of the chutes towards the rear end of the machine are supplied at their upper ends with escape passages or outlets 31 covered by sliding perforated gates 32 which can be manipulated from the exterior of the flume when desired. It will be also observed that the last chute at the rear end of the machine or the one specifically indicated by the reference character 33 Figure 6 has an open bottom so that any material discharged therein will escape through at all times. It is also to be noticed that the partitions 23 form chutes 34 in the upper leg and that the chutes 34 deliver the grain discharged thereinto from the discs to the upper ends of the chutes of the lower leg and the chutes are so arranged and constructed that part of the grain discharged from any one compartment is delivered through the flume to the following compartment through the opening 21 and part of the grain is delivered through the perforated bottoms of the chutes of the lower leg and is discharged from the machine through the opening 22.

Here it is explained that the discs are driven in the direction of the applied arrow Figure 4 at a relatively high speed and the grain, such as barley, is acted upon by the discs and separators and is thrown out of the compartments by centrifugal force into the chutes of the upper leg passing in succession from compartment to compartment through the flume. The screens of the shoe are so chosen that any barley which has been sufficiently pearled will escape through the screens and will accordingly be delivered through the opening 22 and that any barley which has not been sufficiently pearled will be returned over the screens to the discs.

If one or more of the gates 32 are opened at the rear end of the machine, then a less number of discs will be obviously acting on the grain as the passing grain will be free to escape through the openings 31. If all the gates are closed, the grain discharged from the last compartment will be delivered directly through the opening 33 to the lower part of the leg 20 from which it escapes through the opening 22.

The hood is provided at the side remote from the flume with a lengthwise extending screen 35 supplied for the purpose of admitting air to the upper part of the casing and the upper leg of the flume is provided with a lengthwise extending slot 36 which opens to a collector 37 directly connected by a pipe 38 to an exhaust fan 39 which latter is suitably supported by the upper part of the machine frame and is driven directly by an endless chain 39' from the main shaft 5.

According to this latter arrangement, it will be apparent that there is an air blast effected in the upper part of the casing in which dust, broken shells and other light foreign material is held in suspension and is discharged through the pipe 38 to and from the fan casing.

The upper end of the leg 19 of the flume is provided with a removable plate 40 which has one side supplied with a more or less fine abrasive material similar to that of the separators and the other side presenting a relatively coarse abrasive surface. Where barley is being put through the machine, said plate is positioned with the relatively fine abrasive surface facing inwardly and where a grain such as oats which is to be shelled by the machine, is being put through the machine, the plate is reversed to present the coarse surface to the interior. It will be particularly noted that the plate is so positioned that the material thrown tangentially from the tops of the discs, strikes the plate.

An adjustable gate 41 is also supplied at the entrance to the upper leg, this gate being slidably mounted so that it can be moved up and down as desired to control the extent of the entrance area to the upper leg. I have herein shown the gate as provided at its ends with racks 42 which engage with pinions 43 carried by a suitably mounted shaft 44. One end of the shaft is supplied with a spring arm 45 equipped with a tit 46 and a hand grip 47, the tit being adapted to enter one or other of a series of concentrically arranged spaced pockets 48 provided in a stationary head 49 fastened to the main frame.

Obviously one by turning the spring lever or arm will cause the rotation of the shaft and through it the shifting of the gate in either direction depending on the direction of movement of the arm and the tit entering one or other of the pockets, will hold the shaft in any adjusted position. Any other suitable means could be utilized for adjusting the gate without departing from the spirit of the invention.

If the gate be raised, less grain will be thrown into the flume by the discs and conversely if it be lowered, more grain will enter the flume and the gate will be adjusted as experience dictates.

Drive means is supplied for reciprocating the shoe, such comprising in the present instance the following parts. A stub shaft 50 is secured to the main frame and on this I mount rotatably a relatively large chain wheel 51 which is driven by the passing chain 39' and associated with the chain wheel 51, I have a small chain wheel 52 which is connected by an endless chain 53 to a chain wheel 54 secured to a cross shaft 55 carried in suitable bearings provided on the main frame. The shaft 55 is supplied also with a small wheel 56 and the wheel 56 and chain wheel 54 are connected to the arms 27 by pitmen 56'. According to this arrangement, the shoe will be reciprocated by the pitmen when the motor is operated.

The bottom of the casing is provided with a longitudinally extending opening 57 (see Figure 11) and this opening is normally closed by a screen 58 carried by a substantially rectangular screen frame 59 and the screen frame is slidably mounted for endwise shifting movement in an outer frame 60, the outer frame having one side hinged to the casing as indicated at 61 and the other side fastened to the casing by a turn button 62. A handle 59' extends outwardly from the end of the screen frame so that one can shake the screen frame as and when desired to clear small material collecting in the bottom of the casing.

If one wishes to empty or clean out the casing, this can be done by turning the button and swinging down the outer frame which allows any material within the casing to be cleared out through the opening 57 provided.

The machine as herein described can be used for hulling and pearling barley and also for hulling oats and in so far as barley is concerned, it is usually marketed as feed barley, pot barley or pearled barley. If it is desired to make a run for feed barley which is actually barley with the hulls off, the operator will feed the barley into the hopper as the machine is running and will open the gate 32 furthest in from the rear end of the machine and accordingly the grain will only be acted upon by the discs at the front end of the machine so that it will be delivered for the greater part with the hulls off and with very little pearling.

Obviously the grain is operated upon by the first disc in the first compartment at the front end of the machine and is thrown by the disc into the first chute 34 in the upper leg of the flume and is delivered by that chute into the first chute of the lower leg at the front end of the machine which discharges into the second compartment and from this point, the grain will be successively passed from compartment to compartment through the chutes of the flume until it reaches the chute in the lower leg where the gate is pulled out at which time, the said grain will clear through the opening exposed by the withdrawn gate into the lower part of the leg and be discharged through the outlet 22.

On the other hand, if one desired pot barley, a gate 32 nearer the rear end of the machine would be withdrawn so that more discs would operate on the grain and this would result in the grain being all hulled and slightly pearled.

If pearled barley is required, the gates 32 will be left closed and then all discs will operate on the grain and the grain will be retained in the machine until it is pearled sufficiently to pass through the screens and any remaining grain will be delivered from the machine through the opening 33 at the rear end thereof.

Obviously by using the gates 32, one can set the machine to do various kinds of work and in order that the grain may be inspected, I have supplied the upper leg of the flume with a hinged door 63 which can be opened from time to time.

Where barley is being run through the machine, the plate 40 is set with the fine abrasive face facing inwardly. If one desires to use the machine for hulling oats, the plate 40 is set with the coarse face facing inwardly and the oats are not only acted upon by the discs but they are thrown forcibly against the plate and hulled. One can open one or other of the gates 32, the particular gate opened being determined by experience or inspection. The operator will of course set the gate 41 as he thinks best to give satisfactory results.

In the principal views of the drawings, I have shown a horizontal type of machine but the broader principles thereof can be embodied in a machine of the vertical type and such an arrangement is shown in Figures 13 and 14. Here the casing 64 is vertically disposed as is also the main shaft 65 therewithin and the hopper 66 is at the top of the machine and feeds the grain to the upper face of the upper abrasive disc 67 secured to the shaft and operating in the first compartment, it being understood that the casing is crosspartitioned to form a compartment for each disc.

The flume 68 is vertically disposed and has the chutes in the legs thereof arranged so that the grain thrown out by the top disc is led back to the chamber immediately underneath to be acted upon by the second disc and is discharged from the second disc back into the flume and directed to the third disc, the operation being continued throughout the series of discs in a like manner.

A vertical exhaust pipe 69 is located at the side of the flume and is connected by relatively short pipes 70 to the chutes 71 receiving the grain thrown out by the discs and underneath each screen 72 of the return chute 73 is a collecting pan 74 and each pan delivers any grain passing through the screen to a discharge pipe 75 which communicates with a vertical delivery pipe 76. Actually the screens 72 correspond to the screens of the shoe 24 and the pans 74 correspond to the bottom plate of the lower leg 20 and the chutes 73 correspond to the chutes 34.

I have not considered it necessary to fully show and describe a machine of the vertical type as it is only my intent herein to show in a general way that a machine of the vertical type can be readily built and can have the principal features of the horizontal type of machine fully disclosed in this specification.

Where a grain such as wheat is to be hulled, it is desirable to supply the discs with paddles in order to more forcibly pitch the grain from the discs against the coarse abradant surface of the plate 40. In Figure 12, I have shown one of these paddles indicated by the reference numeral 77 and which it will be observed is in the form of a metal plate of the shape shown, the plate being fastened to the disc by a bolt 78 passing therethrough. Any desired number of these paddles can be secured to each disc.

What I claim as my invention is:—

1. In a grain hulling machine, in combination, a casing interiorly divided into a plurality of similar relatively narrow compartments, a rotatably mounted shaft passing longitudinally of the casing and through the compartments, a plurality of discs rotating with the shaft, there being a disc in each compartment, said discs and compartment walls being provided with abradant material, means for feeding grain to be hulled into the first compartment at one end of the casing, grain receiving by-passes exterior of the casing connecting any one compartment with the following compartment, screens in the by-passes and directing the grain passed thereover back into the compartments and means for collecting and discharging from the machine the grain passing through the screens.

2. In a grain hulling machine, in combination, a casing interiorly divided into a plurality of similar relatively narrow compartments, a rotatably mounted shaft passing longitudinally of the casing and through the compartments, a plurality of discs rotating with the shaft, there being a disc in each compartment, said discs and compartment walls being provided with abradant material, means for feeding grain to be hulled into the first compartment at one end of the casing, a flume at the side of the casing and presenting an upper leg communicating with the upper part of the casing and a lower leg having an entrance opening communicating with the several compartments and provided with a discharge outlet, a grain receiving chute in the upper leg opposing each compartment, grain chutes in the lower leg having screen bottoms, said latter chutes delivering to the compartments through the inlet opening aforesaid and said upper and lower chutes acting to by-pass the grain successively from compartment to compartment.

3. In a grain hulling machine, in combination, a casing interiorly divided into a plurality of similar relatively narrow compartments, a rotatably mounted shaft passing longitudinally of the casing and through the compartments, a plurality of discs rotating with the shaft, there being a disc in each compartment, said discs and compartment walls being provided with abradant material, means for feeding grain to be hulled into the first compartment at one end of the casing, a flume at the side of the casing and presenting an upper leg communicating with the upper part of the casing and a lower leg having an entrance opening communicating with the several compartments and provided with a discharge outlet, a grain receiving chute in the upper leg opposing each compartment, grain chutes in the lower leg having screen bottoms, said latter chutes delivering to the compartments through the inlet opening aforesaid and said upper and lower chutes acting to by-pass the grain successively from compartment to compartment and means for effecting an air blast through the upper part of the casing to carry off in suspension light material.

4. In a grain hulling machine, in combination, a horizontally disposed casing interiorly divided by cross partitions into a plurality of similar relatively narrow grain receiving compartments, a rotatably mounted shaft extending lengthwise of the casing and crossing the compartments, a disc located centrally in each compartment and secured to the shaft, the disc and compartment walls presenting abradant surfaces, a side flume leading tangentially from the upper part of the casing to receive grain discharged from the compartments by the rotating discs, said flume having the upper wall thereof in a location adjacent the casing provided with a reversible plate, one face of which presents a relatively fine abrasive surface and the other face of which presents a relatively coarse abrasive surface.

NELSON TRACY.